US009870484B2

(12) United States Patent
Bellert (10) Patent No.: US 9,870,484 B2
(45) Date of Patent: *Jan. 16, 2018

(54) DOCUMENT REDACTION

(71) Applicant: Konica Minolta Laboratory U.S.A., Inc., San Mateo, CA (US)

(72) Inventor: Darrell Eugene Bellert, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 14/611,126

(22) Filed: Jan. 30, 2015

(65) Prior Publication Data

US 2016/0224800 A1    Aug. 4, 2016

(51) Int. Cl.
*G06F 17/22* (2006.01)
*G06F 21/62* (2013.01)
*G06F 17/21* (2006.01)

(52) U.S. Cl.
CPC ........ *G06F 21/6245* (2013.01); *G06F 17/211* (2013.01); *G06F 17/2247* (2013.01)

(58) Field of Classification Search
CPC .................. G06F 21/6245; G06F 17/2247
See application file for complete search history.

(56) References Cited

U.S. PATENT DOCUMENTS

| | | | | |
|---|---|---|---|---|
| 2006/0259977 | A1* | 11/2006 | Patrick | G06F 21/6245 726/26 |
| 2007/0030528 | A1* | 2/2007 | Quaeler | G06F 17/30634 358/453 |
| 2009/0164878 | A1* | 6/2009 | Cottrille | G06F 21/6245 715/210 |
| 2011/0066606 | A1* | 3/2011 | Fox | G06F 17/30867 707/706 |
| 2012/0159296 | A1* | 6/2012 | Rebstock | G06Q 10/00 715/205 |
| 2014/0007186 | A1* | 1/2014 | Agrawal | G06F 21/60 726/1 |

(Continued)

FOREIGN PATENT DOCUMENTS

| | | | | |
|---|---|---|---|---|
| EP | 2851836 | A2 * | 3/2015 | ........... H04L 63/123 |
| GB | 2518433 | A  * | 3/2015 | ........... H04L 63/123 |

(Continued)

OTHER PUBLICATIONS

"How to Redact—New CAED" Article Published Jan. 11, 2015 by U.S. District Court, Eastern District of California (2 pages) http://web.archive.org/web/20150111102830/http://www.caed.uscourts.gov/caednew/index.cfm/cmecf-e-filing/redaction-requirements/how-to-redact/.*

(Continued)

*Primary Examiner* — Joseph P Hirl
*Assistant Examiner* — Thomas Gyorfi
(74) *Attorney, Agent, or Firm* — Osha Liang LLP (57) ABSTRACT

A method for redacting an electronic document (ED) having a file format, including: obtaining a request to redact a sensitive data item in the ED; identifying a first and a second instance of the sensitive data item in a markup of the ED, where the second instance of the sensitive data item is not visible in a rendered version of the ED; and generating a redacted ED having the file format by replacing the first and the second instance of the sensitive data item with a neutral data item.

17 Claims, 6 Drawing Sheets

(56) References Cited

U.S. PATENT DOCUMENTS

| | | | |
|---|---|---|---|
| 2014/0033029 A1* | 1/2014 | Pittenger | G06F 17/24 715/271 |
| 2014/0047556 A1* | 2/2014 | Davis | H04L 63/107 726/28 |
| 2014/0095634 A1* | 4/2014 | Govindaraman | G06F 21/6245 709/206 |
| 2014/0136941 A1* | 5/2014 | Avrahami | G06F 21/6245 715/229 |
| 2014/0317758 A1* | 10/2014 | Avrahami | G06F 21/6245 726/27 |
| 2014/0366158 A1* | 12/2014 | Han | G06F 21/32 726/28 |
| 2015/0134648 A1* | 5/2015 | Deshpande | G06F 17/30554 707/723 |
| 2015/0161406 A1* | 6/2015 | Fox | G06F 21/6245 726/27 |
| 2015/0172294 A1* | 6/2015 | Bittner | G06F 21/6245 726/4 |
| 2015/0378973 A1* | 12/2015 | Korneev | G06F 21/6245 715/256 |

FOREIGN PATENT DOCUMENTS

| | | | | |
|---|---|---|---|---|
| GB | 2531713 A | * | 4/2016 | G06F 21/6245 |
| WO | WO 2006104810 A2 | * | 10/2006 | G06F 21/6218 |
| WO | WO 2007075573 A2 | * | 7/2007 | H04N 1/00864 |
| WO | WO 2009018328 A1 | * | 2/2009 | G06F 21/6245 |
| WO | WO 2013091806 A1 | * | 6/2013 | G06Q 10/10 |

OTHER PUBLICATIONS

"Guide to Redacting Documents in Electronic Form" Article Published Dec. 20, 2014 by Federal Court of Australia (2 pages) http://web.archive.org/web/20141220153156/http://www.fedcourt.gov.au/online-services/preparing-documents-for-the-court/guide-to-redacting-documents-in-electronic-form.*

"Microsoft Word Redactions and Solutions" © 2009 Productivity Portfolio (3 pages) http://web.archive.org/web/20100124100217/http://www.timeatlas.com/Useful_Utilities/Free/Microsoft_Word_Redactions_and_Solutions.*

CodePlex Word 2007/2010 Redaction Tool, Version 1.2, May 24, 2010 (1 page) https://redaction.codeplex.com/.*

Yasutomo Nakayama et al. "Advanced redaction for better document workflow" Published Jul. 11, 2013 (12 pages) https://www.ibm.com/developerworks/data/library/techarticle/dm-1307redaction/dm-1307redaction-pdf.pdf.*

* cited by examiner

Electronic Document 402

Electronic Document as Displayed 404

My social security number is 123-45-6789 and I make $1,000,000 per year!

File: document.xml   Markup of the Electronic Document 406

```
<w:r>
 <mc:AlternateContent>
  <mc:Choice Requires="wps">
   <w:drawing>
    <wp:inline>
     <a:graphic>
      <a:graphicData>
       <wps:txbx>
        <w:txbxContent>
         <w:p>
          <w:r>
           <w:rPr>
            <w:rStyle w:val="CommentReference"/>
           </w:rPr>
           <w:t ">My social security number is 123-45-6789 and I make $1,000,000 per year.</w:t>
          </w:r>
         </w:p>
        </w:txbxContent>
       </wps:txbx>
      </wps:wsp>
     </a:graphicData>
    </a:graphic>
   </wp:inline>
  </w:drawing>
 </mc:Choice>
 <mc:Fallback>
  <w:pict>
   <v:textbox>
    <w:txbxContent>
     <w:p>
      <w:r>
       <w:rPr>
        <w:rStyle w:val="CommentReference"/>
       </w:rPr>
       <w:t >My social security number is 123-45-6789 and I make $1,000,000 per year.</w:t>
      </w:r>
     </w:p>
    </w:txbxContent>
   </v:textbox>
  </v:shape>
  </w:pict>
 </mc:Fallback>
</mc:AlternateContent>
</w:r>
```

File: comments.xml

```
<w:comment>
 <w:p>
  <w:r>
   <w:t>I can't believe you make $1,000,000 per year!</w:t>
  </w:r>
 </w:p>
</w:comment>
```

FIG. 4

Redacted Electronic Document 502

Redacted Electronic Document as Displayed 504

My social security number is ███████ and I make ███████ per year!

Modified Markup Segment 506

```
<w:p>

<w:r>
  <w:rPr>
   <w:rStyle w:val="CommentReference"/>
  </w:rPr>
  <w:t ">My social security number is </w:t>
 </w:r>

<w:r>
  << BLACK RECTANGLE; W: 22 mm, H: 5 mm >>
 </w:r>

<w:r>
  <w:t "> and I make </w:t>
 </w:r>

<w:r>
  << BLACK RECTANGLE; W: 18mm, H: 5mm >>
 </w:r>

<w:r>
  <w:t "> per year.</w:t>
 </w:r>
</w:p>
```

DOCUMENT REDACTION

BACKGROUND

Electronic documents (EDs) are commonly used for storing and disseminating information. This information may include sensitive data items such as, for example, social security numbers, credit card information, income information, etc. EDs may be defined using a document markup language to provide features such as complex formatting, document comments, tracking of changes, etc. The document markup language may include multiple instances of the sensitive data items.

In cases where an intended recipient of the ED is not authorized to access (e.g., view) the sensitive data items, it may be necessary to remove the sensitive data items from the ED. However, removing the displayed instances of a sensitive data item from the ED might not remove all instances of the sensitive data item found within the markup of the ED. An unauthorized user might still be able to view the sensitive data items by accessing the markup of the document. Accordingly, removal of all instances of the sensitive data items from the ED is desirable.

SUMMARY

In general, in one aspect, the invention relates to a method for redacting an electronic document (ED) having a file format. The method comprises: obtaining a request to redact a sensitive data item in the ED; identifying a first and a second instance of the sensitive data item in a markup of the ED, wherein the second instance of the sensitive data item is not visible in a rendered version of the ED; and generating a redacted ED having the file format by replacing the first and the second instance of the sensitive data item with a neutral data item.

In general, in one aspect, the invention relates to a system for redacting an electronic document (ED) having a file format. The system comprises: a computer processor; a user interface (UI) configured to obtain a request to redact a sensitive data item in an electronic document (ED) having a file format; an identification engine (IE) configured to identify a first and a second instance of the sensitive data item in a markup of the ED, wherein the second instance of the sensitive data item is not visible in a rendered version of the ED; and a redaction engine (RE), executing on the computer processor, and configured to generate a redacted ED having the file format by replacing the first and the second instance of the sensitive data item with a neutral data item.

In general, in one aspect, the invention relates to a non-transitory computer readable medium (CRM) storing instructions for redacting an electronic document (ED) having a file format. The instructions comprise functionality for: obtaining a request to redact a sensitive data item in the ED; identifying a first and a second instance of the sensitive data item in a markup of the ED, wherein the second instance of the sensitive data item is not visible in a rendered version of the ED; and generating a redacted ED having the file format by replacing the first and the second instance of the sensitive data item with a neutral data item.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a system, and a non-transitory computer readable medium (CRM) for redacting an ED. Specifically, when a user requests to redact a sensitive data item in the ED, a redacted ED is generated that does not include the sensitive data item. A neutral data item takes the place of the sensitive data item in the redacted ED. The redacted ED may be in the same file format as the original ED.

In one or more embodiments of the invention, the ED may be defined using a document markup language. A document markup language is a system for annotating the body text of an ED in order to provide, for example, formatting instructions. In one or more embodiments of the invention, the document markup language may be Extensible Markup Language (XML). XML is a markup language that defines a set of rules for encoding documents in a format which is both human-readable and machine-readable. Examples of ED file formats that use XML to annotate the body text of the ED include Office Open XML (OOXML), and Open Document Format (ODF), among others. These file formats enable a user to compose EDs. Rendering software interprets the markup language instructions affiliated with the body text of the ED in order to display the body text with the desired formatting.

In one or more embodiments of the invention, the markup of the ED may include tags that represent markup language instructions. A tag, in accordance with one or more embodiments of the invention, may be inserted in the markup of the ED to annotate a word, sentence, or paragraph, for example. Other tags may provide support for the tracking of changes and/or the insertion of footnotes, endnotes, headers and footers, linked text, watermarks, and/or other functionality provided by the markup language. Tags may therefore link additional content to the body text of the ED. This additional content might or might not be displayed to the user. Moreover, the user might or might not be aware that the additional content exists.

In one or more embodiments of the invention, the additional content linked to the body text of the ED may be stored in the same file, along with the body text and the tags of the ED, or in a separate or in multiple separate files. The ED file format may use, for example, separate files for the body text of the document, the document settings, footnotes, comments, etc. Further, in accordance with one or more embodiment of the invention, these separate files may be stored in a single container file, thus enabling the user to manipulate the single container file only, rather than having to manipulate multiple individual files.

In one or more embodiments of the invention, the ED may include a sensitive data item. Sensitive data items may include, for example, social security numbers, credit card information, income information, or other confidential information. Not all instances of the sensitive data item may be visible in the displayed (i.e., rendered ED). A user of the ED may want to remove a sensitive data item from the document, for example, before sharing the ED with other users. As previously described, additional content may be linked to the body text of the ED via tags. This additional linked content may include additional instances of the sensitive data item. For example, a user may have added a comment including the sensitive data item. In another example, the ED may include tracked changes made to the ED, where earlier revisions of the ED may also include the sensitive data item.

One or more embodiments of the invention may enable a user to generate a redacted ED from the original ED. In one or more embodiments of the invention, the user may select the sensitive data item to be redacted, for example, by highlighting the sensitive data item in the displayed document, and subsequently the ED may be searched for instances of the sensitive data item. Next, the detected instances of the sensitive data item may be removed from the ED.

In one or more embodiments of the invention, all instances of the sensitive data item, including rendered instances (i.e., instances that are visible to the user of the ED), instances that are not rendered in the ED but may be rendered under certain circumstances, and instances that are never rendered, may be removed (i.e., redacted) from the ED.

In one or more embodiments of the invention, the redacted ED may have the same file format as the original ED. Accordingly, the redacted ED remains fully editable and provides all features and functionality of the original ED. For example, interactive content such as macros may be retained, and tables and/or charts may remain fully editable. In addition, the layout and formatting of the original ED may be fully maintained such that the perceivable differences between the original ED and the redacted ED are limited to the redacted sensitive data item.

Figure 1:
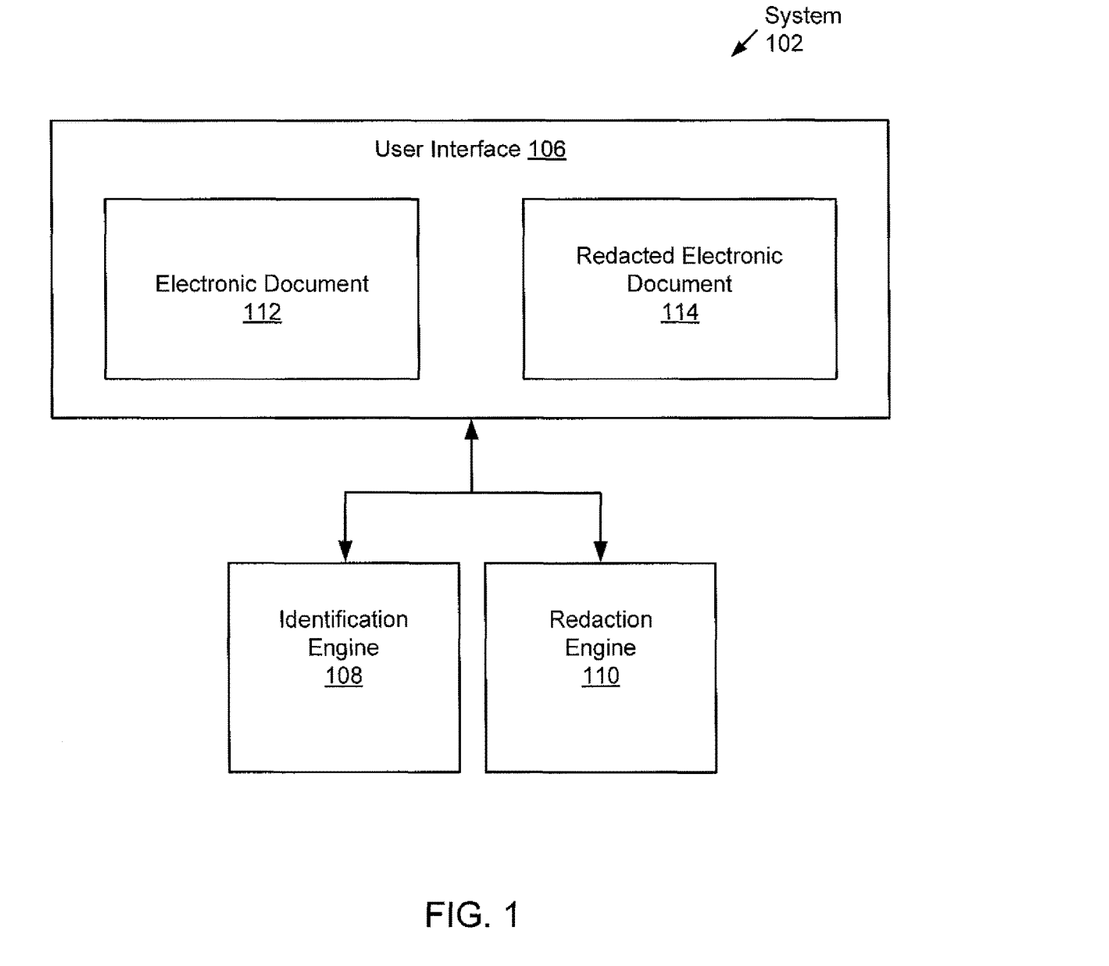
FIG. 1 shows a schematic diagram of a system in accordance with one or more embodiments of the invention.

FIG. 1 shows a system (102) in accordance with one or more embodiments of the invention. As shown in FIG. 1, the system (102) has multiple components, including a user interface (106), an identification engine (108), and a redaction engine (110). Each of these components may be located on the same computing device (e.g., desktop computer, server, laptop computer, tablet computer, smart phone, etc.) or may be located on different computing devices connected by a network having wired and/or wireless segments.

In one or more embodiments, the system (102) includes the user interface (106). The user interface (106) is configured to receive user requests to open, display, and redact EDs (e.g., ED (112)). The user interface (106) may also be configured to display the redacted ED (114). For example, the user interface may be a graphical user interface (GUI) with multiple widgets (e.g., dropdown boxes, buttons, radio buttons, etc.) that can be manipulated by the user. In one or more embodiments of the invention, the user identifies/specifies a sensitive data item to be redacted within the ED (112) by highlighting an instance of the sensitive data item within the displayed (i.e., rendered) ED (112). Alternatively, the user could enter the sensitive data item in a "search box" from the GUI. In one or more embodiments of the invention, the user interface prompts the user every time an instance of a sensitive data item is identified within the ED (112). By responding to the prompt, the user can choose to redact or not redact instances of the sensitive data item on an instance-by-instance basis (discussed below). Alternatively, the user could select to redact all instances of the sensitive data item.

In one or more embodiments of the invention, the system (102) includes the identification engine (108). The identification engine (108) is configured to search the markup of the ED (112) for instances of the sensitive data item. This may include parsing the body of the ED (112) for tags, and then parsing the additional non-rendered content linked using the tags for instances of the sensitive data item. This searching operation may be executed on the entire markup, or only a portion of the markup that surrounds the visible instance of the sensitive data item that has been highlighted by the user. This searching operation may extend into one, multiple, or all files that define the ED (112).

In one or more embodiments of the invention, the system (102) includes the redaction engine (110). The redaction engine (110) is configured to generate the redacted ED (114). Specifically, the redaction engine (110) is configured to replace each identified instance of the sensitive data item in the ED (112) with a neutral data item (e.g., a random number, a random alphanumeric string, a box or other shape, an image, etc.). The same neutral data item may be used to replace all instances of the sensitive data item. Additionally or alternatively, different neutral data items may be used to replace different instances of the sensitive data item. In one or more embodiments of the invention, a bounding box is determined for each instance of the sensitive data item. The bounding box provides the size of the sensitive data item in the displayed (i.e., rendered) ED (112). The redaction engine (110) may remove each identified instance of the sensitive data item and insert a neutral data item having the same size of the bounding box in its place.

Those skilled in the art, having the benefit of this detailed description, will appreciate that the ED (112) may have multiple instances of the sensitive data item. When the ED (112) is eventually rendered (e.g., printed, displayed) by a rendering engine, some instances of the sensitive data item are visible in the rendered version of the ED, while other instances of the sensitive data item might not be visible in the rendered version of the ED. Different rendering engines (i.e., rendering engines executing different software versions, having different settings, having different configurations, etc.) may render the ED differently. Accordingly, the instances of the sensitive data item that are visible vs. invisible may vary between different rendered versions of the ED. However, all instances of the sensitive data item may be still be seen by viewing the markup of the ED.

Those skilled in the art, having the benefit of this detailed description, will appreciate that by replacing all instances of the sensitive data item with the neutral data item in the markup of the ED, regardless of whether the instance is eventually rendered, it will no longer be possible for an end user to view the sensitive data item in the markup of the redacted ED. In other words, not only will visible instances of the sensitive data item be replaced with the neutral data item, but even the instances of the sensitive data item that are not rendered but are in the markup will be replaced.

While FIG. 1 shows a configuration of components, other configuration may be used without departing from the scope of the invention. For example, various components may be combined to create a single component. As another example, the functionality performed by a single component may be performed by two or more components.

Figure 2:
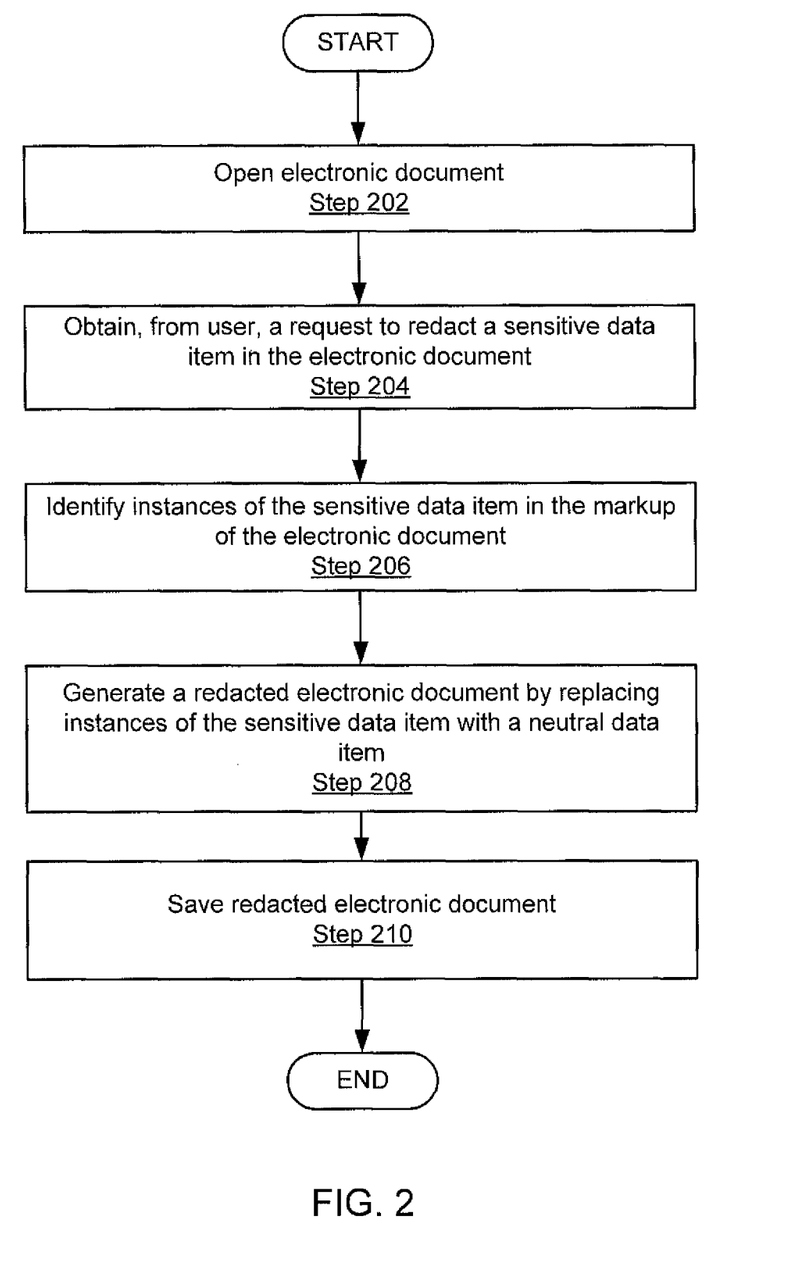
FIG. 2 shows a flowchart in accordance with one or more embodiments of the invention.

FIG. 2 shows a flowchart in accordance with one or more embodiments of the invention. The process depicted in FIG. 2 may be used to redact an ED. One or more of the steps in FIG. 2 may be performed by the components of the system (102), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, an ED is opened (Step 202). The user may select the ED to open using a GUI. The ED may be stored on a local storage device or on a network storage device. The ED may be defined using a markup language (e.g., OOXML, ODF). In response to the open request, the ED may be rendered and displayed to the user. Within the displayed ED, there may be one or more instances of one or more sensitive data items (e.g., salary information, social security numbers, etc.). These might or might not be the only instances of the sensitive data items within the ED (i.e., other instances of the sensitive data items may be in the ED, but not visible).

In Step 204, the user identifies a sensitive data item(s) in the ED and submits a request for redaction of the sensitive data item(s). Specifically, the user may specify the sensitive data item(s) by highlighting an instance(s) of the sensitive data item in the displayed ED. Additionally or alternatively, the user may input (e.g., type in, or speak) the sensitive data item(s). For example, the user may enter the detected sensitive data item(s) in a dialog box or use other means (e.g., microphone) to specify the sensitive data item(s).

In Step 206, instances of the sensitive data item(s) in the ED are identified. In one or more embodiments of the invention, identifying the instances of the sensitive data item(s) includes searching for additional instances of the sensitive data item(s) in the body text and in other areas of the markup or files of the ED. The searching may cover the entire ED. Additionally or alternatively, the searching may be restricted to a predefined portion of the ED that includes the visible instance of the sensitive data item. The predetermined portion may be, for example, the paragraph of the body text that contains the instance of sensitive data item(s) identified by the user. In one or more embodiments of the invention, the boundaries of the predetermined portion may be configurable. For example, the predetermined portion may be limited to the sentence or paragraph of the body text that contains the instance of sensitive data item(s) identified by the user.

In one or more embodiments of the invention, identifying the instances of the sensitive data item(s) includes parsing the predetermined region for possibly non-rendered tags that may link additional content of the ED to the body text of the ED. As described above, this additional content may be, for example, comments, prior versions of the document, footnotes, etc. In one or more embodiments of the invention, the additional content may be searched to locate additional instances of the sensitive data item(s). In one or more embodiments of the invention, the type of additional content to be searched may be configurable. For example, only comments, or only prior versions of the document may be searched, or all types of additional content may be searched. In one or more embodiments of the invention, the additional content to be searched may be distributed over multiple files. For example, separate files may exist for comments, prior versions of the document, footnotes, etc.

In one or more embodiments of the invention, each identified instance of a sensitive data item may be presented to the user. If the instance is visible in the displayed (i.e., rendered) ED, presenting the instance may include positioning the displayed ED such that the instance is in center of the screen and/or has a different appearance (e.g., different font size, different color, highlighting, etc.) than the rest of the displayed ED. If the instance is not visible in the displayed (i.e., rendered) ED, presenting the instance may include displaying via the GUI the instance and within what context the instance was found. For example, if the instance was found in a non-visible comment, then a dialogue box could be presented to the user explaining that the sentence containing the instance has a comment that also contains the instance. Alternatively, if the instance was found in document history, then a dialogue box would be presented to the user with the list of prior versions that contain the instance. The user may approve or reject the redaction of the presented instance. This enables the user to approve or reject the redaction of an instance on an instance-by-instance basis.

Figure 3:
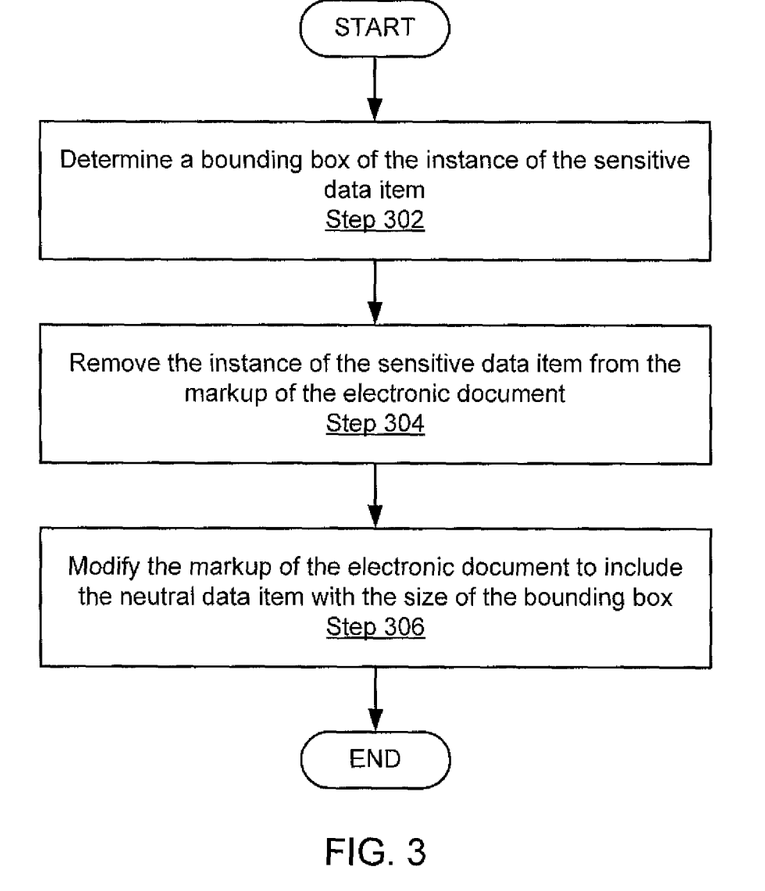
FIG. 3 shows a flowchart in accordance with one or more embodiments of the invention.

In Step 208, a redacted ED is generated. The redacted ED is generated by replacing each instance (or each user approved instance) of the sensitive data item(s) with a neutral data item (e.g., random number, random alphanumeric string, a box or other graphic or clipart, an image, etc.). FIG. 3 provides additional details regarding Step 208.

In Step 210, the redacted ED is saved. The redacted ED has the same file format as the original (i.e., non-redacted) ED.

FIG. 3 shows a flowchart in accordance with one or more embodiments of the invention. The process depicted in FIG. 3 may be used to generate a redacted ED. Specifically, the process depicted in FIG. 3 may correspond to Step 208, discussed above in reference to FIG. 2. Accordingly, the process depicted in FIG. 3 may be repeated for each instance of a sensitive data item. One or more of the steps in FIG. 3 may be performed by the components of the system (102), discussed above in reference to FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

In Step 302, a bounding box for the instance of the sensitive data item is determined. The bounding box provides the size, in the rendered ED, of the instance of the sensitive data item. For example, a sensitive data item displayed using a 12 pt font size may result in a smaller bounding box than the same sensitive data item displayed using a 16 pt font size.

In Step 304, the instance of the sensitive data item is removed from the markup of the ED. In Step 306, a neutral data item is inserted into the ED. The neutral data item has the size specified by the bounding box. Sizing the neutral data item according to the geometry of the bounding box ensures that the inserted neutral data item occupies an amount of space similar to the amount of space occupied by the now-deleted instance of sensitive data item, thus ensuring that the layout of the ED is not altered by the replacement. The redacted ED, in accordance with one or more embodiments of the invention, may therefore have a layout that is indistinguishable or almost indistinguishable from the layout of the original ED.

In one or more embodiments of the invention, the neutral data item may be a geometrical object, such as, for example, a solid black rectangle, or any other geometrical object suitable to fill the space in the ED where the instance of the sensitive data item was removed. Replacement of the instance of the sensitive data item with a neutral data item that is a geometrical object may require additional segmentation of the body text and the insertion of additional markup language instructions, discussed below in reference to FIG. 4 and FIG. 5.

In one or more embodiments of the invention, the neutral data item may consist of a string, such as, for example, "%%%", "$$$", "***", or it may consist of characters that form a geometrical object, such as for example " ". In such embodiments, replacing an instance of the sensitive data item with a neutral data item that consists of characters may require determining the appropriate font size and the number of characters to be inserted in lieu of the sensitive data item.

Figure 4:
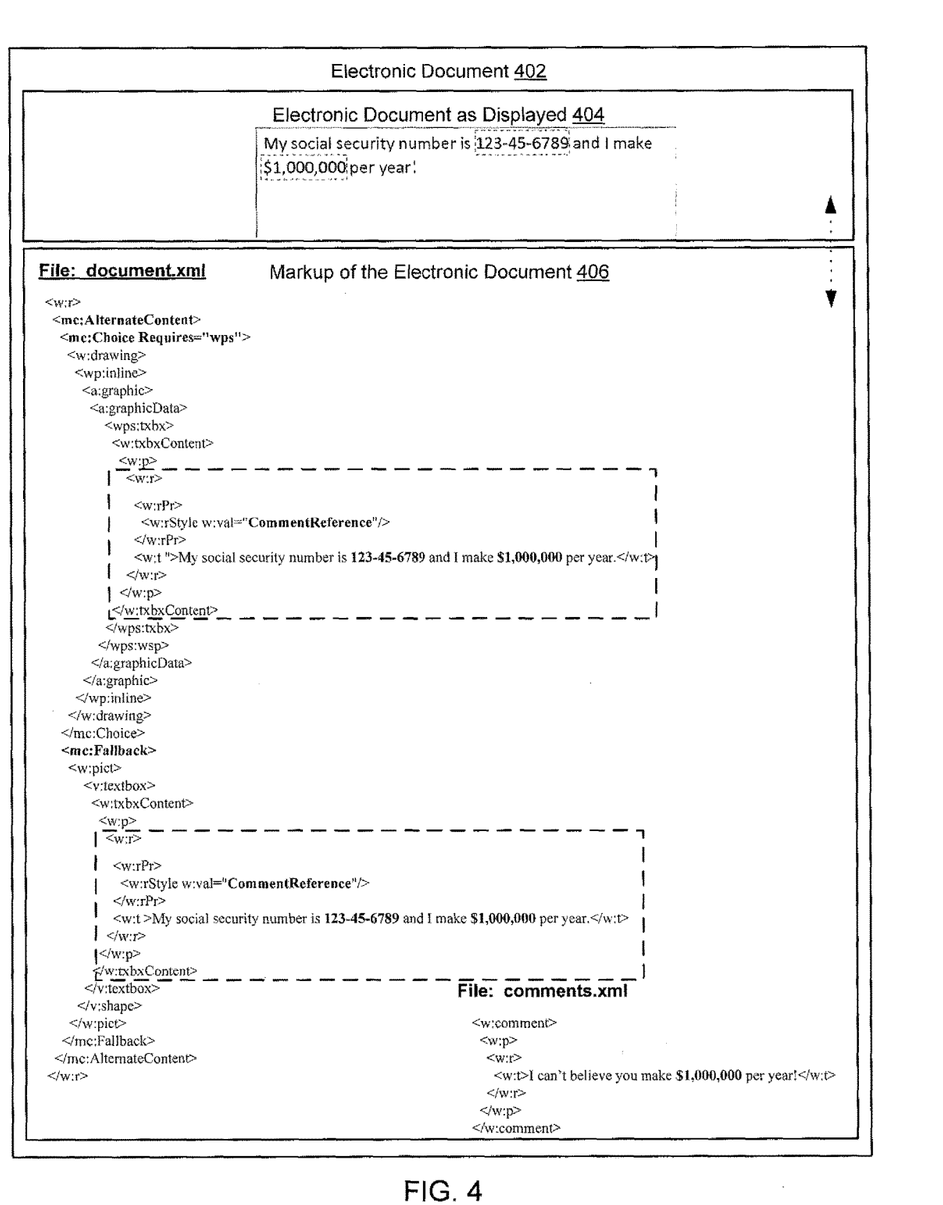
FIG. 4 and FIG. 5 show examples in accordance with one or more embodiments of the invention.
Figure 5:
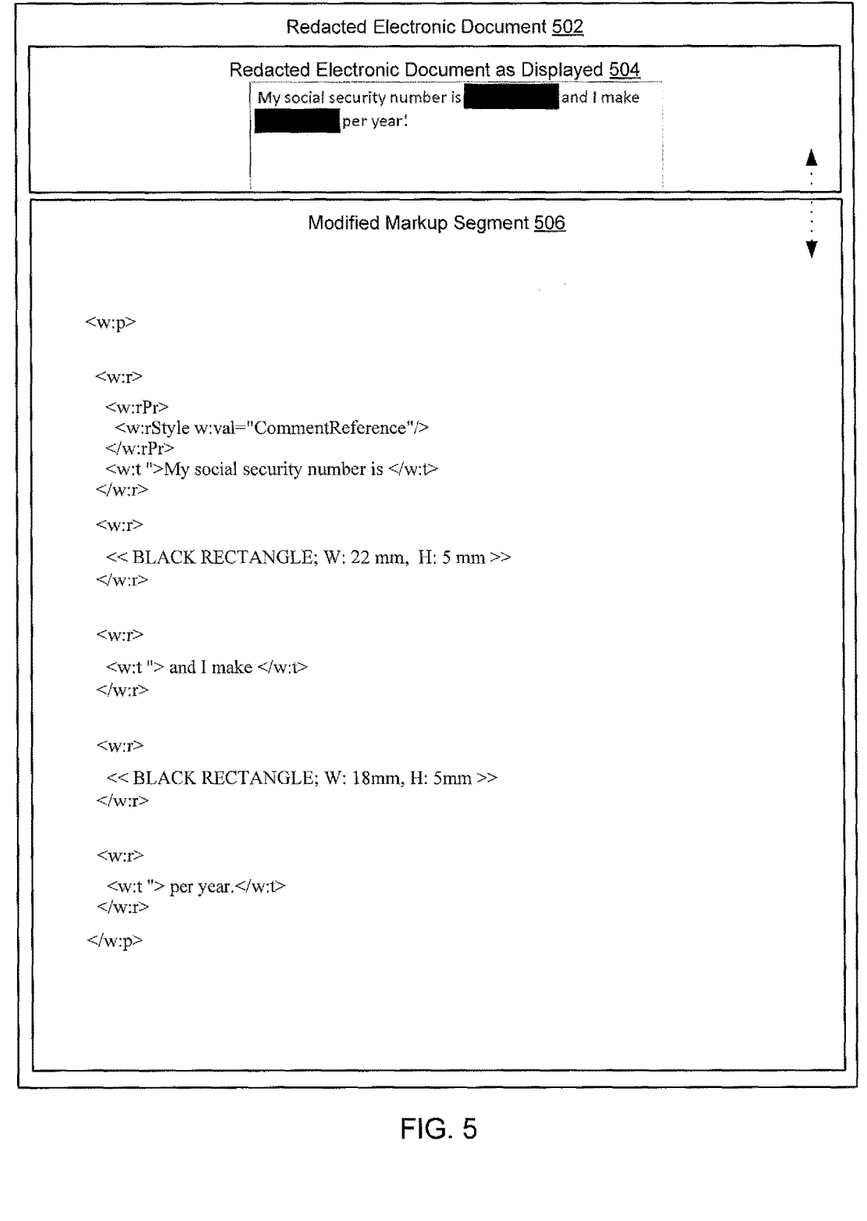

FIG. 4 and FIG. 5 show examples in accordance with one or more embodiments of the invention. FIG. 4 shows an original ED (402), and FIG. 5 shows the redacted ED (502) derived from the original ED (402). The following example is for explanatory purposes only and is not intended to limit the scope of the invention.

Turning to FIG. 4, assume the ED (402) includes a text box that displays sensitive data items: a social security number and an annual salary. Further, assume the ED (402) includes the document.xml file having the body text of the ED. Further still, assume the ED is compatible with different versions of rendering software. Accordingly, the document.xml file may have substantially redundant portions, with different portions being used by different versions of the rendering software to display or print the ED. As a result of the multiple portions, two instances of each sensitive data item appear in the document.xml file (e.g., one instance per portion).

The ED also includes the comments.xml file having a comment referring to the body text of the ED. The comment may have been made by a third-party user who viewed the ED. This comment includes an instance of one sensitive data item (i.e., the annual salary). Moreover, each portion of the document.xml file includes a tag "CommentReference" indicating that a comment was added to the text box (i.e., a comment exists).

In the example, a user decides to create the redacted ED (502) that does not display the social security number and the annual salary. Accordingly, when inspecting the ED as displayed (404), the user highlights "123-45-6789" and "$1,000,000" to specify an instance of a sensitive data item. Multiple instances of the sensitive data items are then identified the ED. Specifically, two instances of "123-45-6789" and two instances of "$1,000,000" in the document.xml file are identified. During the parsing of the ED, the tag "CommentReference" is identified/encountered. This triggers a parsing of the comments.xml file where yet another instance of the "$1,000,000" is identified.

Next, it is determined that the width and the height of the bounding box for "$1,000,000", in view of font size and other formatting applied, are 22 mm and 5 mm, respectively. Further, it is determined that the width and the height of the bounding box for "123-45-6789" are 18 mm and 5 mm, respectively. All instances of the sensitive data items are removed. Moreover, instructions to generate black rectangles are inserted into the markup. These black rectangles replace the now-removed instances of sensitive data items. Moreover, when rendered, these black rectangles will occupy approximately the same amount of space within the rendered ED as the sensitive data items. FIG. 5 shows the displayed redacted ED (504). FIG. 5 also shown an example of the modified markup (506) which has been simplified for clarity. The modified markup (506) corresponds to a segment of the markup (406) that is enclosed by a box having a dashed perimeter.

As shown in the modified markup (506), the sentence "My social security number is 123-45-6789 and I make $1,000,000 per year" is segmented into multiple sentence fragments separated by the inserted rectangles. As mentioned previously, the redacted content could also have been replaced with alternate neutral content such as " ". A similar sentence segmentation (not shown) is performed to redact the comment "I can't believe you make $1,000,000 per year!" stored in the comments.xml file.

Various embodiments of the invention have one or more of the following advantages: the ability to generate redacted EDs where all instances of sensitive data items have been replaced with neutral data items; the ability to generate a redacted ED that is in the same file format as the original ED; the ability for users to redact an ED without any knowledge of the markup language used in the ED; the ability to maintain the layout of the ED even though the sensitive data items are replaced with neutral data items; the ability to fragment displayed text in order to accommodate the inserted neutral data items; the ability to replace sensitive data items in files or portions of the ED other than the main body text (e.g., comments, etc.); the ability to redact sensitive data items in an ED that is compatible with multiple versions of one or more rendering engines and thus has redundant portions; etc.

Figure 6:
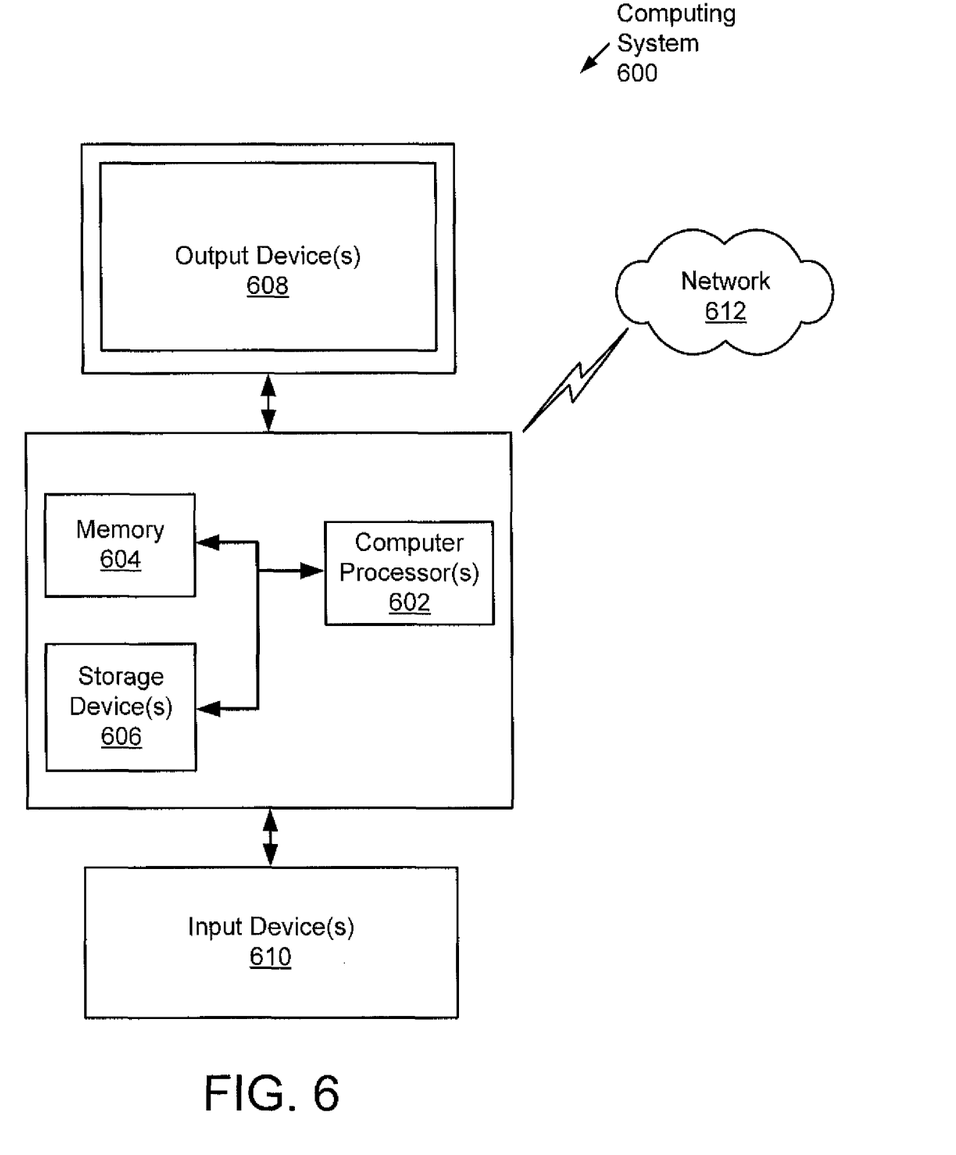
FIG. 6 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for redacting an electronic document (ED) having a file format, comprising:
   obtaining a request to redact a sensitive data item in the ED;
   identifying a first instance and a second instance of the sensitive data item in a markup of the ED,
   wherein the second instance of the sensitive data item is not redacted, not rendered, and not visible in a rendered version of the ED; and
   generating a redacted ED having the file format by:
      determining a bounding box for the first instance of the sensitive data item in the rendered version of the ED;
      determining a size of the bounding box;
      replacing a first portion of the markup comprising the first instance with a first tag specifying a neutral data item and an attribute specifying the neutral data item has the size in a rendered version of the redacted ED; and
      replacing a second portion of the markup comprising the second instance of the sensitive data item with a second tag specifying the neutral data item.

2. The method of claim 1, further comprising:
   identifying a third instance of the sensitive data item in the markup of the ED,
   wherein generating the redacted ED further comprises replacing the third instance of the sensitive data item with the neutral data item, and
   wherein the first instance of the sensitive data item and the third instance of the sensitive data item are located in different files in the markup of the ED.

3. The method of claim 1, further comprising:
   identifying, during a parsing of a predetermined portion of the markup surrounding the first instance of the sensitive data item, a tag to additional content in the ED; and
   identifying, during a parsing of the additional content, the second instance of the sensitive data item.

4. The method of claim 1, wherein the file format is selected from the group consisting of Open Office XML (OOXML) and Open Document Format (ODF).

5. The method of claim 1, further comprising:
   displaying the ED to a user before generating the redacted ED,
   wherein the user generates the request to redact the sensitive data item by highlighting the sensitive data item in the displayed ED.

6. The method of claim 1, further comprising:
   identifying, during a search of the markup, a third instance of the sensitive data item;
   displaying a prompt to a user based on the third instance;
   receiving, in response to the prompt, an instruction to not redact the third instance; and
   resuming the search without replacing the third instance based on the instruction.

7. The method of claim 1, wherein the neutral data item is one selected from the group consisting of a solid rectangle drawing and a predefined string of characters.

8. A system for redacting an electronic document (ED) having a file format, comprising:
   a memory; and
   a computer processor connected to the memory that:
      obtains a request to redact a sensitive data item in the electronic document (ED);
      identifies a first instance and a second instance of the sensitive data item in a markup of the ED,
      wherein the second instance of the sensitive data item is not redacted, not rendered, and not visible in a rendered version of the ED; and
      generates a redacted ED having the file format by:
         determining a bounding box for the first instance of the sensitive data item in the rendered version of the ED;
         determining a size of the bounding box;
         replacing a first portion of the markup comprising the first instance with a first tag specifying a neutral data item and an attribute specifying the neutral data item has the size in a rendered version of the redacted ED; and
         replacing a second portion of the markup comprising the second instance of the sensitive data item with a second tag specifying the neutral data item.

9. The system of claim 8, wherein the computer processor also:
   identifies a third instance of the sensitive data item in the markup of the ED; and
   replaces the third instance of the sensitive data item in the markup with the neutral data item,
   wherein the first instance of the sensitive data item and the second instance of the sensitive data item are located in different files in the markup of the ED.

10. The system of claim 8, wherein the computer processor also:
    identifies a tag for additional content in the ED during a parsing of a predetermined portion of the markup surrounding the first instance of the sensitive data item; and identifies, during a parsing of the additional content, the second instance of the sensitive data item.

11. The system of claim 8, wherein the computer processor also:
displays the ED to a user before the redacted ED is generated, wherein the user generates the request to redact the sensitive data item by highlighting the sensitive data item in the displayed ED.

12. The system of claim 8, wherein the computer processor also:
identifies, during a search of the markup, a third instance of the sensitive data item;
displays a prompt to a user based on the third instance; and
receives, in response to the prompt, an instruction to not redact the third instance, wherein the third instance is not replaced based on the instruction.

13. A non-transitory computer readable medium (CRM) storing instructions for redacting an electronic document (ED) having a file format, the instructions comprising functionality for:
obtaining a request to redact a sensitive data item in the ED;
identifying a first and a second instance of the sensitive data item in a markup of the ED,
wherein the second instance of the sensitive data item is not redacted, not rendered, and not visible in a rendered version of the ED; and
generating a redacted ED having the file format by:
determining a bounding box for the first instance of the sensitive data item in the rendered version of the ED;
determining a size of the bounding box;
replacing a first portion of the markup comprising the first instance with a first tag specifying a neutral data item and an attribute specifying the neutral data item has the size in a rendered version of the redacted ED; and
replacing a second portion of the markup comprising the second instance of the sensitive data item with a second tag specifying the neutral data item.

14. The non-transitory CRM of claim 13, wherein the instructions further comprise functionality for:
identifying a third instance of the sensitive data item in the markup of the ED,
wherein generating the redacted ED further comprises replacing the third instance of the sensitive data item with the neutral data item, and
wherein the first instance of the sensitive data item and the third instance of the sensitive data item are located in different files in the markup of the ED.

15. The non-transitory CRM of claim 13, wherein the instructions further comprise functionality for:
identifying, during a parsing of a predetermined portion of the markup surrounding the first instance of the sensitive data item, a tag for additional content in the ED; and
identifying, during a parsing of the additional content, the second instance of the sensitive data item.

16. The non-transitory CRM of claim 13, wherein the instructions further comprise functionality for:
displaying the ED to a user before generating the redacted ED,
wherein the user generates the request to redact the sensitive data item by highlighting the sensitive data item in the displayed ED.

17. The non-transitory CRM of claim 13, wherein the instructions further comprise functionality for:
identifying, during a search of the markup, a third instance of the sensitive data item;
displaying a prompt to a user based on the third instance;
receiving, in response to the prompt, an instruction to not redact the third instance; and
resuming the search without replacing the third instance based on the instruction.

* * * * *